United States Patent
Licona et al.

(10) Patent No.: US 8,958,273 B1
(45) Date of Patent: Feb. 17, 2015

(54) DISC READ RETRY DEVICES AND METHODS

(71) Applicant: Marvell International Ltd., Hamilton (BM)

(72) Inventors: Estuardo Licona, Milpitas, CA (US); Mats Oberg, San Jose, CA (US); Wim Schonkeren, Lommel (BE)

(73) Assignee: Marvell International Ltd., Hamilton (BM)

(*) Notice: Subject to any disclaimer, the term of this patent is extended or adjusted under 35 U.S.C. 154(b) by 0 days.

(21) Appl. No.: 14/153,725

(22) Filed: Jan. 13, 2014

Related U.S. Application Data

(60) Provisional application No. 61/756,313, filed on Jan. 24, 2013.

(51) Int. Cl.
*G11B 7/00* (2006.01)
*G11B 20/18* (2006.01)

(52) U.S. Cl.
CPC .................. *G11B 20/1816* (2013.01)

USPC ........................................... 369/44.32

(58) Field of Classification Search
None
See application file for complete search history.

(56) References Cited

U.S. PATENT DOCUMENTS

| | | | |
|---|---|---|---|
| 6,697,310 B1 * | 2/2004 | Kuriuzawa et al. | 369/53.11 |
| 6,721,494 B1 * | 4/2004 | Kanno et al. | 386/265 |
| 7,852,722 B2 * | 12/2010 | Kikugawa et al. | 369/53.12 |
| 7,944,788 B2 * | 5/2011 | Murata | 369/53.13 |
| 2003/0058762 A1 * | 3/2003 | Schultz et al. | 369/47.13 |
| 2006/0092788 A1 * | 5/2006 | Wei | 369/47.25 |
| 2013/0166973 A1 * | 6/2013 | Sakurai | 714/718 |
| 2014/0029133 A1 * | 1/2014 | Tagami et al. | 360/75 |

* cited by examiner

*Primary Examiner* — Brenda Bernardi

(57) ABSTRACT

Devices and methods capable of controlling disc read operations are disclosed. For example, an electronic circuit can include an error-severity determining circuit configured to determine a severity of read error that occurs for a block of data read from a disc, and a re-read decision-making circuit that determines whether to re-read the block of data based on the severity of read error.

18 Claims, 3 Drawing Sheets

DISC READ RETRY DEVICES AND METHODS

INCORPORATION BY REFERENCE

This application claims the benefit of U.S. Provisional Application No. 61/756,313 entitled "CD-DA Read Retry Algorithm" filed on Jan. 24, 2013, the content of which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Data storage media, such as optical and magnetic discs, often fail to properly record or deliver data due to defects in, or damage to, the discs. For example, a scratch on the surface of an optical disc can cause an optical reader to erroneously read one or more bits.

For a given disc read operation, a system drive reads a block of data, which will include the underlying information (e.g., text, music and/or video) and one or more Error Correction Code (ECCs) used to detect and correct small numbers of errors. When the errors are too many to correct, re-reading operations can be performed until a successful read is performed or until there is insufficient time for another attempt.

SUMMARY

Various aspects and embodiments of the invention are described in further detail below.

In an embodiment, an electronic circuit capable of controlling a disc read operation includes an error-severity determining circuit configured to determine a severity of read error that occurs for a block of data read from a disc, and a re-read decision-making circuit that determines whether to re-read the block of data based on the severity of read error.

In another embodiment, an electronic circuit capable of controlling a disc read operation includes an error correction code circuit configured to determine whether or not a block of data read from an optical disc containing digital audio information contains an uncorrectable error, an error-severity determining circuit configured to determine a severity of read error that occurs for the block of data read from a disc when the error correction code circuit determines that the block of data contains uncorrectable errors; and a re-read decision-making circuit that determines whether to re-read the block of data based on the severity of read error, wherein the re-read decision-making circuit determines whether to re-read the block of data based on whether the severity of read error indicates that there will be a successful likelihood of reading the block of data upon N number or re-read operations, wherein N is a positive integer.

In yet another embodiment, a method for controlling a disc read operation, includes determining whether or not a block of data read from a disc contains an uncorrectable error, and if the block of data contains an uncorrectable error, determining whether to re-read the block of data based on a type of uncorrectable error.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

For purpose of ease of explanation, the systems and methods described below are directed to providing data to a Compact Disc Digital Audio (CD-DA) processing back-end. However, the concepts described below can be expanded to cover a variety of other data, such as visual and/or text data. The systems and methods below also can be expanded to cover a variety of other media types, such as magnetic discs.

Figure 1:
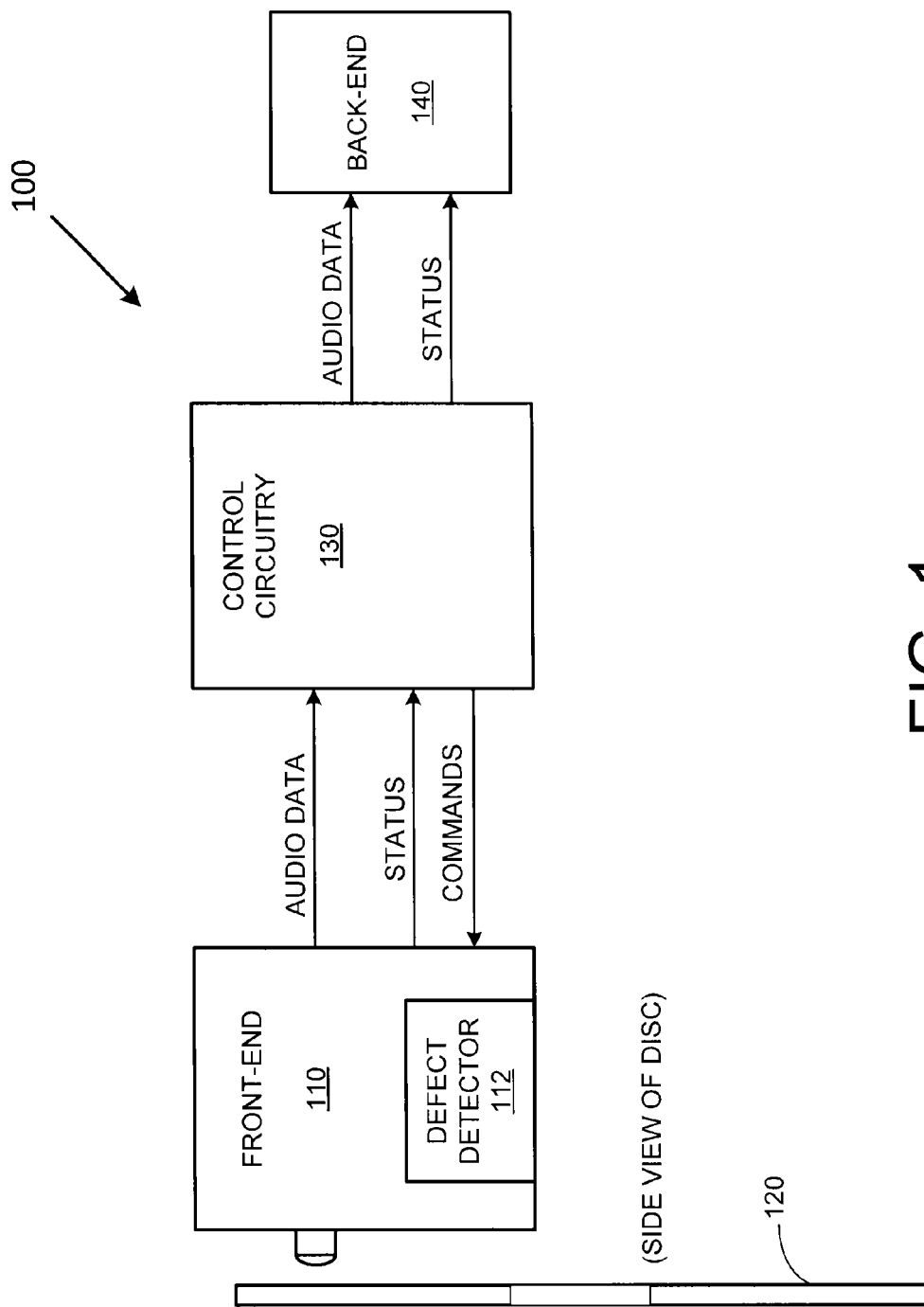
FIG. 1 is a generalized block diagram of a compact audio disc with an electronic circuit capable of reading data embedded on the disc.

FIG. 1 is a generalized block diagram of audio disc components 100 capable of reading data embedded on an optical disc 120. The audio disc components 100 include a front-end 110 in proximity to the optical disc 120, control circuitry 130 and a back-end 140. The front-end 110 contains a defect detector 112 capable of sensing and reporting defects (along with their locations) in the optical disc 120, as well as detect and report other problems, such as transient servo issues that can cause read errors.

In a read operation, as disc 120 spins, the front-end 110 attempts to sense a series of microscopic pits representing blocks of audio data, then pass the blocks of audio data along with any pertinent status data to the control circuitry 130. In a nominal CD-DA playback system, the goal is to provide audio data to an audio back-end exactly as the audio data was encoded in a disc. However, due to imperfections in the writing process, disc handling and/or imperfect read optics, audio data read from the disc might not necessarily match that recorded on the disc. Accordingly, status information is provided to the control circuitry 130 contemporaneously with audio information.

The control circuitry 130 reviews each block of data so as to detect and, if necessary, correct errors. Error detection and correction is performed using Error Correction Codes (ECCs) embedded in each block of data. As ECC codes are well-known and understood by those skilled in the art, no further explanation will be provided.

If there are no errors in a block of data, then the control circuitry 130 passes the uncorrupted data to the back-end 140. If there are correctable errors, then the control circuitry 130 corrects the errors using the ECCs, and passes the corrected data to the back-end 140. However, if there are uncorrectable errors, the control circuitry 130 makes a decision to either: (1)

pass the data with errors to the back-end 140 for presentation to a listener, or (2) make another attempt to read the data correctly.

When error-filled data is passed to the back-end 140, the ideal situation is to inform to the back-end 140 that there are errors in the data and the respective location of each error. If this information is provided, the audio processing back-end 140 can then mask those errors for the user using a number of techniques, such as data zeroing and interpolation. Thus, audio data corruption is less critical than with other types of data. Accordingly, a different set of criteria can be used to optimize disc performance.

The process by which a conventional CD-DA drive makes a decision whether to perform a re-read operation is based on two criteria. The first is whether the data read has been decoded properly; the second one being whether there is sufficient data in the back-end audio buffer to allow the drive to perform a retry.

The methods and systems of this disclosure, however, provide new criteria as to whether to retry or not, i.e., whether available data indicates that a re-read operation will likely result in corrected data after one or more attempts, or perhaps whether a re-read operation is likely to at least improve on the current data by lessening the number of bit errors.

If a re-read operation is likely to improve on the current data, then a re-read operation is commanded by the control circuitry 130; otherwise, the corrupted data is passed on to the back-end 140. There are different hardware signals and signal-processing techniques that can be used to make this decision, and a description of some of them are provided below.

Data written to a CD-DA uses CIRC (Cross-Interleaved Reed-Solomon Code) encoding and has two layers of error correction, called C1 and C2 codes. In the decoding process, when data is being read from a disc, the C1 code is decoded first, where after the data is de-interleaved and the C2 code is decoded. The interleaving process spreads out the data from the C1 codewords to different C2 codewords so that the likelihood of failing to decode the C2 codeword is reduced. This interleaving process also allows the combined codes to handle longer bursts of errors. Burst errors generally arise when there is a defect on a disc being read or when a transient servo effect occurs. When such burst of errors happen, it may be possible to recover the data on the disc with a re-read operation if the underlying root cause of the failure is one that might not be present when the re-read operation takes place, such as the transient servo effect case.

However, when a permanent defect of sufficient length exists, e.g., longer than the C1/C2 error code combination can handle, it may not be possible to recover error-free data even if multiple retries take place. This situation is the one that can be addressed with various hardware signals. For example, when an excessive number of bit-errors are detected indicating that re-reading a block of information will not result in fewer bit errors or perhaps a more advantageous distribution of bit errors, the control circuitry 130 makes a decision to not re-read the disc 120, and pass corrupt data to the back-end 140 with various status signals (e.g., error number and locations) to enable the back-end 140 to best mask the errors in the data. The main goal of doing this is to minimize the number of unnecessary re-read operations. This in turn leads to faster reads, and maintains more data in the data buffer, which in turn improves playback quality.

In the example of FIG. 1, the defect detector 112 provides hardware signals that the control circuitry 130 uses to determine whether a re-read operation is warranted, including signals as to whether a defect is present in disc 120, whether a read operation was defective due to transient servo-mechanical issues, whether some other hardware-detectable issue that can affect a read operation is measured and likely bit-error locations. The defect detector 112 passes such information to the control circuitry via the status line of FIG. 1.

Accordingly, whenever a hard defect, such as a discontinuity in the media, a scratch or a black dot is present on the disc 120, the defect detector 112 can pass the appropriate information to the control circuitry 130 to allow the control circuitry 130 to make an informed decision. For example, if the defect detector 112 indicates that the maximum defect size caused by a scratch is possibly correctable by the C1/C2 codes, then the control circuitry 130 can issue a read retry command. Even if subsequent data is erroneous, fewer errors can lead to improved audio performance. In contrast, if the maximum defect size caused by the scratch clearly exceeds the length of the C1/C2 ECCs, then the control circuitry 130 can choose not to perform a re-read operation given the low-likelihood of data improvements after one or more re-read operations.

In another example, the control circuitry 130 uses offset and gain accumulator values, servo tracking and focus error signals to determine that there is an interruption of the recording layer (i.e., a media defect or discontinuity) in disc 120 that is longer than those that the C1/C2 codes can correct. Again, evaluating the duration and location of the errors can help the control circuitry 130 determine whether it would be feasible to recover the data in a reread operation, and determine whether a reread operation should be performed.

In yet another example, the control circuitry 130 uses signal processing on the received data, such as determining whether there exists an expected range of zero-crossings within a block of data. For example, if the frequency of zero crossings is outside an expected range, it may be determined that a media defect or disc damage is so extensive as to make a re-read operation unlikely to provide improved results.

Figure 2:
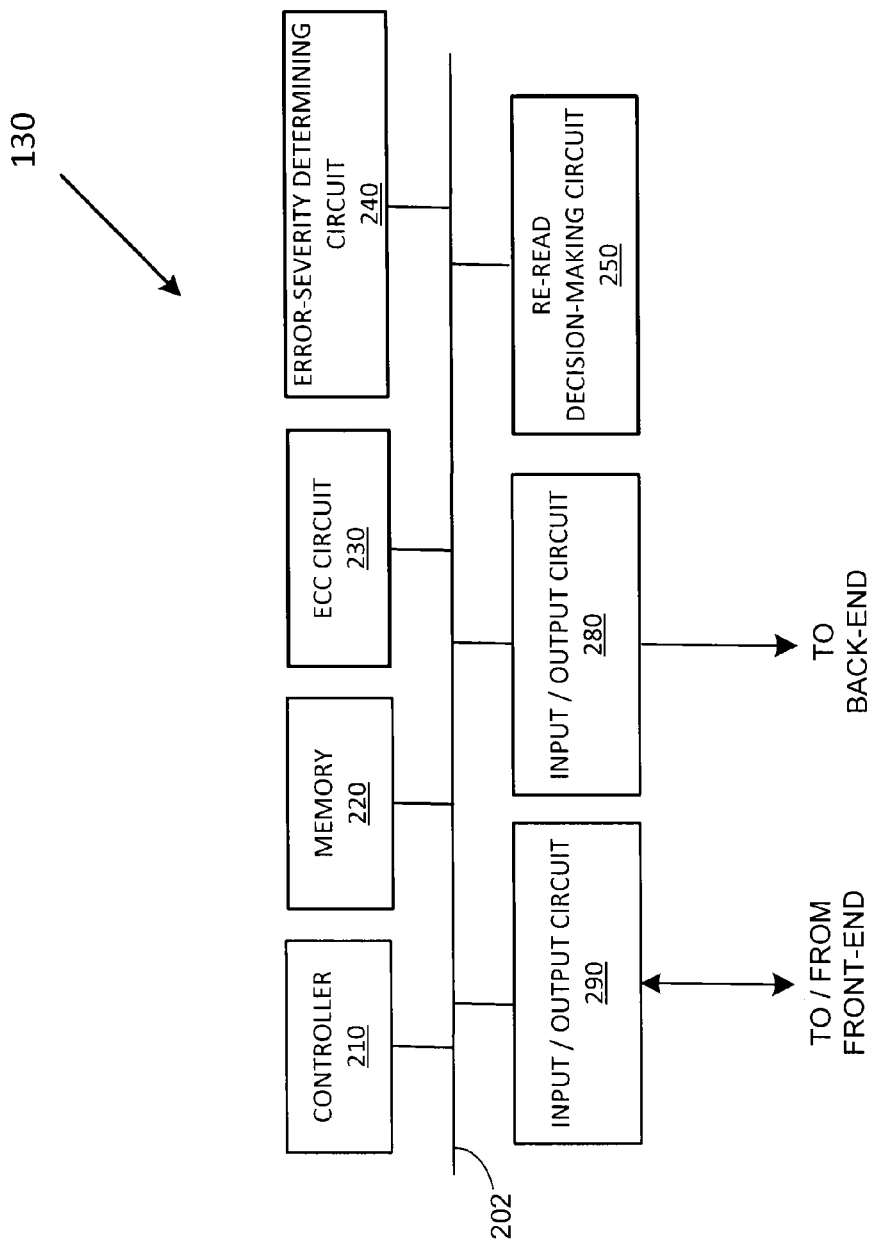
FIG. 2 is an example of a block diagram of the control circuitry of FIG. 1.

FIG. 2 is an example of a block diagram of the control circuitry 130 of FIG. 1. The control circuitry 130 includes a controller 210, a memory 220, an Error Correction Circuit (ECC) circuit 230, an error-severity determining circuit 240, a re-read decision-making circuit 250, a first input-output circuit 280 and a second input-output circuit 290. The above components are coupled together with control/data bus 202. Although the example of FIG. 2 uses a bused architecture controlled by a sequential instruction device, it is to be appreciated that there is a wide range of other architectures capable of performing equivalent tasks, such as a collection of dedicated gates hardwired to one another using dedicated data and control lines.

In operation and under control of instructions in the memory 220, the controller 210 causes blocks of data to be received by an optical front-end via the second input-output circuit 290, and forward the blocks of data to the ECC circuit 230. Similarly, the controller 210 causes status information relating to the received data to be received and forwarded to the error-severity determining circuit 240.

The ECC circuit 230 then detects and corrects any errors in the received data, if possible. If the ECC circuit 230 receives or can provide error-free data, then the error-free data is forwarded to an audio back-end via the first input-output circuit 280.

If the ECC circuit 230 cannot produce error-free data, then the error-severity determining circuit 240 determines whether one or more re-read operations is likely to produce error-free data or at least provide data having fewer errors or a more advantageous distribution of errors. This can be accomplished using the received status information and/or by performing various signal processing routines, such as determining a frequency of zero crossings that give rise to an inference of a substantial media defect.

Using the data from the error-severity determining circuit 240, the re-read decision-making circuit 250 makes a determination as to whether to command a front-end to perform a re-read operation.

If the re-read decision-making circuit 250 determines that a re-read operation is desirable, then a signal is sent to the optical front-end via the second input/output circuit 290 commanding a re-read operation assuming that there is adequate time for one, e.g., whether another read operation would take so much time that an audio buffer would empty in the interim causing a pause in an audio play.

The re-read data and associated status information are then received and processed as before noting that re-read operations can always be limited to a maximum number and even to a single re-read operation.

In alternative embodiments, it is also possible for the re-read decision-making circuit 250 to command a set of N re-read operations (N being a positive integer), and choose the most desirable data set from the N reads to pass to the back-end.

If the re-read decision-making circuit 250 determines that a re-read operation is not desirable, then the data is forwarded to the back-end via the first input/output circuit 280 along with whatever useful information, e.g., bit-error positions and numbers of bit errors, is available.

Figure 3:
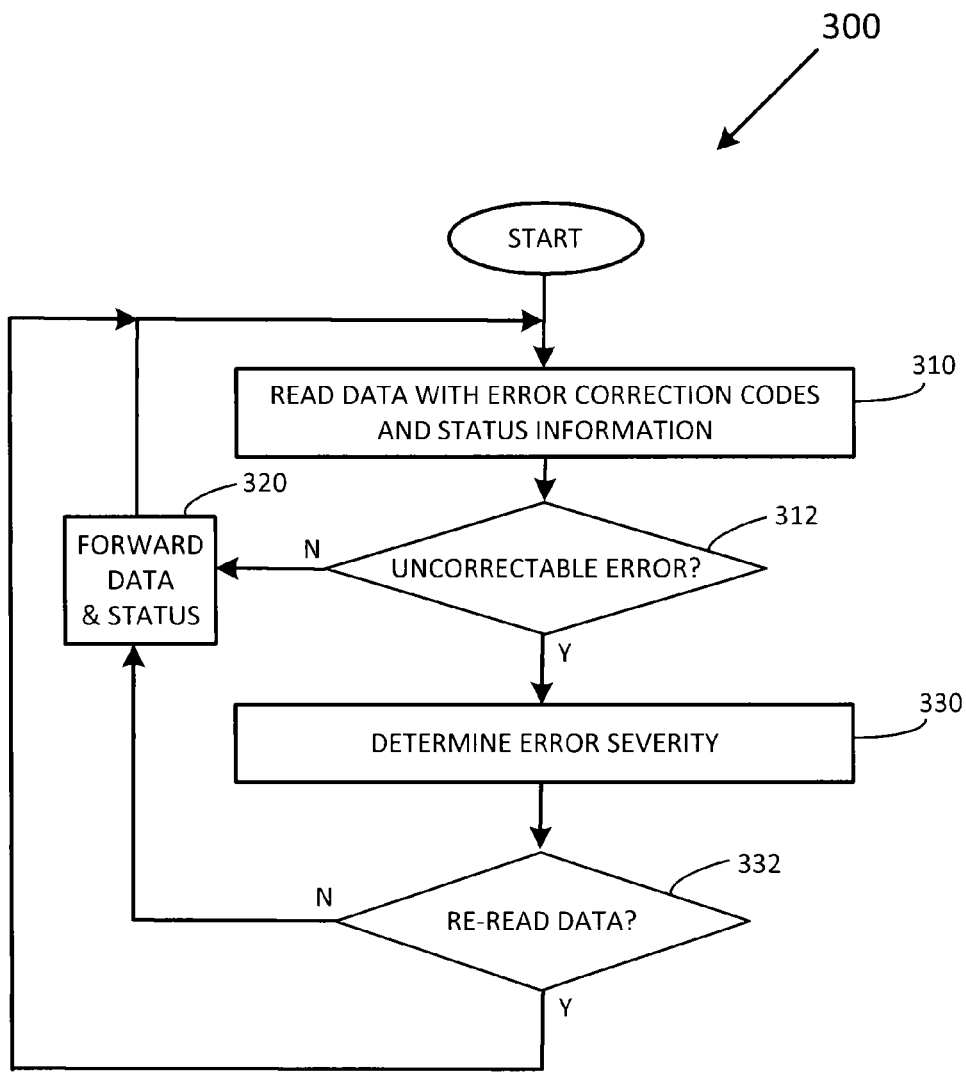
FIG. 3 is a flowchart outlining a set of example operations for operating the devices of FIGS. 1-2.

FIG. 3 is a flowchart outlining a set of example operations for operating the devices of FIGS. 1-2. Although individual operations are shown as occurring in a specific order, it is to be appreciated in light of this specification that it is possible for certain operations to occur in different orders or simultaneously depending on a particular embodiment of overall functionality or hardware implementation.

At 310, a block of data with embedded error correction codes and relevant status information is received by some combination of control circuitry. Next, in S312, a determination is made as to whether the data contains a number of errors that cannot be corrected by the available error correction codes. If the data is correct or can be corrected, control jumps to S320 where the data is forwarded to a back-end (along with any status information that might be helpful) and control jumps back to S310 where a next block of data is read and received. However, if the data contains one or more uncorrectable errors, control continues to S330.

At S330, the severity of errors is determined indicating whether a re-read operation will likely result in improved data. That is, as discussed above a determination is made as to the likely source of errors, e.g., servo issues or a media scratch, as well as the severity of an error source, e.g., the width and length of a scratch.

At S332, a determination is made based on the information determined in S330 as well as other possible criteria, such as time limitations. If a re-read operation is not likely to result in improved data, then control jumps to S320 where the corrupted data and any helpful status information is passed on to a back-end; otherwise, control jumps to 310 where the block of data is re-read and received. Control blocks S310-S332 are then repeated as necessary.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. An electronic circuit capable of controlling a read operation from a storage medium, comprising:
   an error-severity determining circuit configured to determine a severity of read error that occurs for a block of data read from the storage medium;
   a re-read decision-making circuit that determines whether to re-read the block of data based on the severity of read error; and
   an error correction code circuit configured to determine whether or not the block of data contains an uncorrectable error, and when the error correction code circuit determines that the block of data contains uncorrectable errors, the error-severity determining circuit determines the severity of read error.

2. The electronic circuit of claim 1, wherein:
   the re-read decision-making circuit determines whether to re-read the block of data based on whether the severity of read error indicates that there will be a correct reading of the block of data upon N number of re-read operations, wherein N is a positive integer.

3. The electronic circuit of claim 2, wherein N=1.

4. The electronic circuit of claim 1, wherein:
   the re-read decision-making circuit determines whether to re-read the block of data based on whether the severity of read error indicates that there will be a correct reading of data with a reduced number or errors upon N number or re-read operations, wherein N is a positive integer.

5. The electronic circuit of claim 4, wherein N=1.

6. The electronic circuit of claim 4, further comprising a defect detector configured to determine a severity of media defect of the storage medium associated with the block of data, and report the type of defect to the error-severity determining circuit.

7. The electronic circuit of claim 6, wherein the defect detector is configured to detect a transient servo error associated with the block of data, and report the transient servo error to the error-severity determining circuit.

8. The electronic circuit of claim 6, wherein the defect detector is configured to detect lengths and positions of burst errors in the block of data, and report the lengths and positions to the error-severity determining circuit.

9. The electronic circuit of claim 6, wherein:
   error-severity determining circuit is configured to determine the severity of a defect associated with the block of data based upon a frequency of zero crossings of the data in the block of data.

10. The electronic circuit of claim 6, wherein the defect detector is configured to detect defects in compact discs containing audio information.

11. An electronic circuit capable of controlling a disc read operation, comprising:
    an error correction code circuit configured to determine whether or not a block of data read from an optical disc containing digital audio information contains an uncorrectable error;
    an error-severity determining circuit configured to determine a severity of read error that occurs for the block of data read from a disc when the error correction code circuit determines that the block of data contains uncorrectable errors; and
    a re-read decision-making circuit that determines whether to re-read the block of data based on the severity of read error, wherein the re-read decision-making circuit determines whether to re-read the block of data based on whether the severity of read error indicates that there will be a reading of the block of data with fewer errors upon N number of re-read operations, wherein N is a positive integer.

12. The electronic circuit of claim 11, further comprising a defect detector configured to determine lengths and positions of errors with the block of data and a transient servo error associated with the block of data, and report the lengths and positions of errors and/or the servo error to the error-severity determining circuit and the re-read decision-making circuit.

13. The electronic circuit of claim 11, wherein:
the error-severity determining circuit is configured to determine the severity of error associated with the block of data based upon a frequency of zero crossings of the data in the block of data.

14. A method for controlling a read operation of a storage medium, comprising:

determining whether or not a block of data read from the storage medium contains an uncorrectable error; and if the block of data contains an uncorrectable error, determining whether to re-read the block of data based on a severity of uncorrectable error.

15. The method of claim 14, wherein determining whether to re-read the block of data includes determining whether there will be a reading of the block of data with fewer errors upon N number or re-read operations, wherein N is a positive integer.

16. The method of claim 15, wherein N=1.

17. The method of claim 15, wherein determining whether to re-read the block of data includes detecting lengths and positions of burst errors in the block of data.

18. The method of claim 15, wherein determining whether to re-read the block of data includes determining a frequency of zero crossings of the data in the block of data.

* * * * *